United States Patent [19]

Frick et al.

[11] Patent Number: 4,798,089
[45] Date of Patent: Jan. 17, 1989

[54] ISOLATOR APPARATUS

[75] Inventors: Roger L. Frick, Chanhassen; Dean S. Pierce, St. Paul, both of Minn.

[73] Assignee: Rosemount Inc., Eden Prairie, Minn.

[21] Appl. No.: 24,981

[22] Filed: Mar. 12, 1987

[51] Int. Cl.$^4$ .......................... G01L 7/08; G01L 9/00; G01L 13/02

[52] U.S. Cl. ....................... 73/706; 73/715; 73/716; 73/717

[58] Field of Search .................. 73/706, 715, 716, 717, 73/718, 719, 720, 721, 722, 723, 724, 725, 726, 727, 728, 729, 756; 361/283

[56] References Cited

U.S. PATENT DOCUMENTS

| | | | |
|---|---|---|---|
| 1,924,091 | 8/1933 | Eisenhour | 73/729 |
| 2,671,833 | 3/1954 | Dunmyer et al. | 73/729 |
| 2,725,749 | 12/1955 | Green | 73/706 |
| 2,989,084 | 6/1961 | Jones | 73/729 |
| 3,618,390 | 11/1971 | Frick | 73/398 C |
| 4,370,890 | 2/1983 | Frick | 73/718 |

Primary Examiner—Donald O. Woodiel
Attorney, Agent, or Firm—Kinney & Lange

[57] ABSTRACT

An isolator apparatus for coupling pressure from a pressurized fluid carried in a conduit to a pressure sensor in a pressure transmitter having an isolation diaphragm, isolation fluid, and a pressure sealing ring for providing an annular seal around an active region of the isolation diaphragm. The isolator apparatus includes a rigid support for spacing the pressure sealing ring away from the active region which reduces pressure measurement errors related to temperature-induced isolation fluid expansion, such that the annular seal overhangs the isolation diaphragm's active region.

17 Claims, 3 Drawing Sheets

ISOLATOR APPARATUS

BACKGROUND OF THE INVENTION

1. Field of the Invention

The present invention relates to an isolator apparatus for isolating a pressure sensor in an instrument such as a pressure transmitter from a fluid such as pressurized process fluid.

2. Description of the Prior Art

A process fluid monitored by an instrument can be corrosive and can damage a pressure sensor in the instrument if direct contact between the fluid and the sensor occurs. An isolator arrangement can be interposed between the pressure sensor and an input flange or a manifold which couples the instrument to a conduit carrying the fluid.

Such a prior art isolator arrangement comprises an isolation diaphragm, isolation fluid and a pressure sealing ring. A thin, flexible, substantially round isolation diaphragm is disposed in a cylindrical inlet port provided in the instrument's housing for receiving the process fluid and deflects in response to pressure exerted on a first side of the diaphragm by the process fluid. The diaphragm is sealingly joined about its outer border, such as by a continuous weld, to a substantially cylindrical side wall of the inlet port thereby sealing the outer border of the diaphragm to the port. A central deflectable portion of the diaphragm is surrounded by the outer border and comprises the active region responsive to pressure. A second side of the diaphragm opposite the process fluid is open to a sealed isolation chamber provided in the instrument, which is substantially filled with a substantially incompressible fluid, such as silicone oil. The isolation fluid couples pressure through a passageway provided in the instrument leading from the isolation chamber to the isolated pressure sensor. Movement of the isolation fluid in response to deflection of the isolation diaphragm thus transfers the process fluid's pressure to the isolated pressure sensor. The pressure sealing ring, such as an "O ring" type made of resilient material, is disposed around the isolation diaphragm and sealingly couples process fluid from the input flange to the isolation diaphragm. In such a prior art arrangement, the sealing ring is compressed between the input flange and the isolation diaphragm. This compression prevents deflection of a portion of the isolator diaphragm adjacent the sealing ring. The annular seal provided around the isolation diaphragm by the pressure sealing ring thus limits the effective area of the isolation diaphragm's active region.

Isolation fluids can expand as temperature increases. Thus, as increased operating temperature can cause an expansion of the isolation fluid which is confined within the enclosed isolation chamber and passageway of the instrument, the isolation diaphragm's active region will respond in the effective area by deflecting to accommodate the increased isolation fluid volume. The accommodation of the expanded isolation fluid volume increases stress in the diaphragm. The stressed diaphragm exerts a pressure on the enclosed isolation fluid and that pressure is sensed by the sensor. The sensor senses the pressure of the process fluid plus the pressure due to the isolator diaphragm stress. The sensed pressure thus suffers from temperature-induced errors. These pressure measurement errors are generally proportional to the change in isolation fluid pressure divided by the change in volume due to diaphragm movement (dp/dv). Since dp/dv is an isolation diaphragm parameter which is a strong function of the effective area of the diaphragm's active region, it is desirable to use an isolation diaphragm having a large effective area, such that it is sufficiently compliant to accommodate the volumetric changes in isolation fluid and thereby minimize pressure measurement error. Increasing, for example, the effective area of a round isolation diaphragm, by increasing the diameter of its deflectable effective area from 1 inch to 1.2 inches, can reduce temperature-induced pressure measurement errors by a factor of two or more.

In such prior art isolation arrangements, however, since the effective area of the active region can be no greater than the region surrounded by the pressure sealing ring, the sealing ring's size becomes a limiting factor. For example, a compressible sealing ring mounted within an inlet port over a round isolation diaphragm having a 1.25 inch diameter deflectable active region yields an effective area of the active region having a diameter of approximately only 1.0 inch when compressed between the input flange and diaphragm. Further diaphragm constraints arise from the use of increasingly smaller solid state pressure sensors with correspondingly reduced instrument housings, which further restrict the space available for isolation diaphragms. In pressure transmitters, the size of the sealing ring can be further restricted by the space available between bolts joining the transmitter to an industry standard flange adapter union.

SUMMARY OF THE INVENTION

This invention relates to an isolator apparatus for coupling pressure from a fluid carried in a conduit, such as industrial process fluid, to a pressure sensor in an instrument which provides an output as a function of pressure. The isolator apparatus is coupled by an input member, such as an input flange or flange adapter union or manifold, to the conduit. An inlet port is disposed in the apparatus for receiving the process fluid from the conduit. Isolation means are disposed in the inlet port for isolating the process fluid from the pressure sensor, while coupling the process fluid's pressure to the sensor. The isolation means include an active region responsive to process fluid pressure. Sealing means are disposed in the inlet port around the isolation means for sealingly coupling the process fluid from the conduit and input member to the isolation means. Support means are disposed in the inlet port for spacing the sealing means away from the active region of the isolation means, such that an effective area of the isolation means is substantially the entire active region and the effective area is not reduced by the sealing means, thereby improving the instrument's output for a selected size of pressure seal.

In a preferred embodiment, the isolation means comprise a thin, flexible, substantially round isolation diaphragm formed of metal which is sealingly joined at an outer border about its periphery, such as by a continuous weld, to a substantially cylindrical side wall forming a cylindrical inlet port in the instrument housing, thereby enclosing an isolation chamber. The portion of the isolation diaphragm surrounded by the joining weld defines the diaphragm's active region which deflects in response to the process fluid pressure acting on a side of the diaphragm exposed to the process fluid. Pressure is coupled from the isolation diaphragm through a substantially incompressible isolation fluid disposed in the isolation chamber, such as silicone oil, to act on a pressure sensor disposed in the instrument. Seal support means comprise a ring-like seal support member having an annular, tapering wall disposed in the inlet port and supported over the outer border of the isolation diaphragm. The tapering wall extends inwardly from the inlet port's side wall and tapers away from the isolation diaphragm a selected distance to define a central opening for passage of process fluid therethrough to act on the isolation diaphragm. Sealing means comprise a pressure sealing ring, such as an "O ring" made of resilient material, which is held in compression between the seal support member and the input member, to effect an annular seal therebetween.

The isolator apparatus thus spaces the pressure sealing ring away from the active region of the isolation diaphragm, such that the pressurized fluid acts against substantially the entire active region, including the outer periphery thereof which lies in the recess beneath the overhanging seal support member and pressure sealing ring. The present invention thus improves the effective area of the isolation diaphragm's active region with respect to a given size of pressure seal, which in turn minimizes dp/dv related pressure measurement errors, thereby substantially improving the instrument's output. In further preferred embodiments, various modifications to the seal support member and isolation diaphragm are provided which further improve the isolation diaphragm's active region, facilitate cleaning and repair of the isolation diaphragm and provide protection from damage during handling, and can lower the cost of materials by reducing the amount of instrument parts which need to be fabricated of expensive, corrosion resistant materials. Further, the present isolator apparatus permits the use of instruments having smaller diameter isolation diaphragms with correspondingly reduced sizes of instrument housings, without compromising performance.

DETAILED DESCRIPTION OF THE PREFERRED EMBODIMENT

Figure 1:
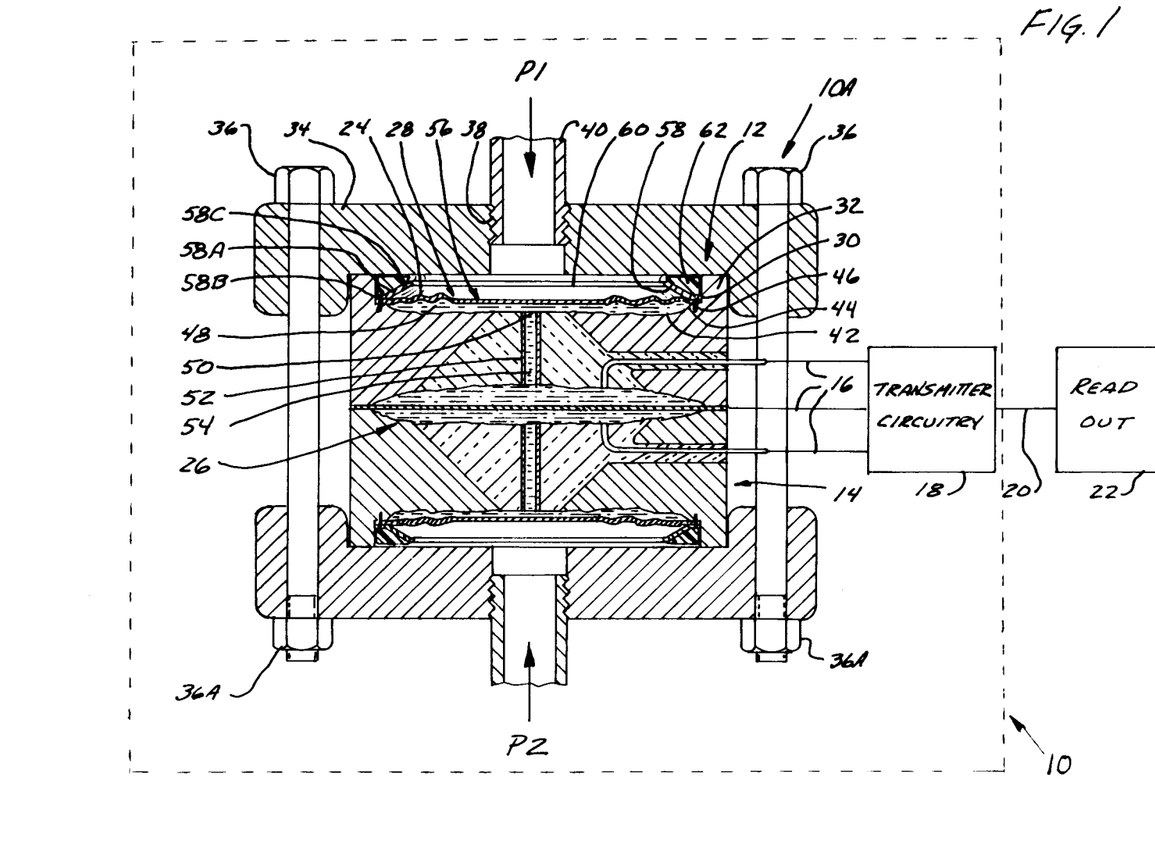
FIG. 1 is a drawing of an instrument including a block diagram representation of circuitry of a differential pressure transmitter having isolation diaphragms mounted therein, showing an isolator apparatus according to the invention.

In FIG. 1, a first embodiment of a pressure transmitter 10 is shown having an isolator apparatus 12 according to the present invention disposed in a sensor module 10A shown in cross section in FIG. 1. The transmitter 10 includes a differential pressure transducer 14 of the capacitive type, as taught by U.S. Pat. No. 3,618,390 issued on Nov. 9, 1971 to Roger L. Frick, which is incorporated herein by reference, and which provides a signal representative of sensed pressure along lines 16 to transmitter circuitry 18. The transmitter circuitry 18 can be of any desired type suitable to transducer 14 for providing an output representative to sensed pressure along line 20 to readout 22. The isolator apparatus 12 is not limited to use only with differential pressure transmitters, but can also be used, for example, with absolute and gauge pressure transmitters and other apparatus utilizing an isolator arrangement including an isolation diaphragm. The isolator apparatus 12 cna also be used, for example, with other types of pressure sensors such as strain gage, piezoresistive, piezoelectric, variable reluctance, and optical.

The transducer 14 comprises a substantially round isolation diaphragm 24 for receiving a pressure P1 and a pressure sensor of the capacitive type shown generally at 26 centrally disposed in the transducer. An inlet port 28 having a substantially cylindrical side wall 30 is provided in a transducer housing 32 to receive the pressurized process fluid to be sensed, which may be gaseous or liquid. The inlet port 28 has a mating process fluid input flange 34, which can comprise a flange as shown, or a standard flange adapter union, connected thereto and retained by retaining bolts 36 and nuts 36A. The input flange 34 has a central threaded opening 38 into which a suitable pressurized fluid supply conduit 40 can be threaded. The conduit 40 is coupled to a source of process fluid having a pressure P1 to be measured.

A base wall 42 is machined in the housing 32 to define a floor for the inlet port 28 which substantially corresponds to the surface contour of the isolation diaphragm 24, shown to be partially corrugated in FIG. 1. Along the peripheral edge of the base wall 42 where it joins the side wall 30, an annular shoulder 44 is provided. The isolation diaphragm 24 is continuously welded at a weld 46 along its periphery to the annular shoulder 44 and forms a sealed isolator chamber 48 which opens through an outlet 50 in the base wall 42 to a passageway 52 which connects to the pressure sensor 26. The isolation diaphragm 24 is thin, flexible and formed of metal, and is preferably corrugated to extend its operating range. Operation of the capacitive sensor 26 is described in U.S. Pat. No. 3,618,390, which is incorporated herein by reference.

A suitable isolation fluid 54, preferably a substantially incompressible fluid such as silicone oil, substantially fills the interconnected isolation chamber 48 and passageway 52 communicating with the pressure sensor 26 each half of which is also filled with isolation fluid 54. The isolation fluid 54 thus functions as a pressure transmitting medium between the isolation diaphragm 24 which is exposed to the pressurized process fluid and the isolated pressure sensor 26. Essentially identical dual isolation diaphragms 24 are each disposed on opposite sides of the pressure sensor 26 and communicate with the pressure sensor through isolation fluid 54 for sensing a differential in process fluid pressure. Thus, when a differential in pressure (P1−P2) between the process fluid exists, the isolation diaphragm 24 will deflect accordingly, causing the isolation fluid 54 to in turn act upon the pressure sensor 26 which provides a capacitive signal to transmitter circuitry 18.

The active region 56 (FIG. 2) of the isolation diaphragm 24 comprises the deflectable portion of the diaphragm 24 responsive to pressure from the process fluid. Since, however, isolation fluids generally expand when the transmitter is subjected to increased operating temperature environments, the isolation diaphragm's active region 56 will also respond by deflecting to accommodate the increased fluid volume. The increased isolation diaphragm stress associated with such temperature induced deflection can introduce pressure measurement errors which are generally proportional to the change in isolation fluid pressure divided by the change in volume due to diaphragm movement (dp/dv). Because dp/dv is a strong function of the total effective area of the isolation diaphragm's active region 56, it is desirable that the isolation diaphragm 24 have as large an effective area in the active region 56 as possible, such that it is of sufficient size and compliance to accommodate the temperature-induced isolation fluid expansion and minimize pressure measurement error.

A pressure seal, which must generally be used with pressure transmitters to sealingly couple the pressurized process fluid from an input flange to an inlet port by providing an annular seal around an isolation diaphragm, has heretofore undesirably limited the size of the isolation diaphragm's effective area of the active region. Such prior art pressure seals typically comprise "O rings" formed of a resilient material, and can also comprise low friction "Teflon" brand material, which is tetrafluoroethylene. An isolation diaphragm's effective area is undesirably limited, for example, to that region circumscribed by the annular seal formed by such a pressure sealing ring when placed within an inlet port and compressed by retaining bolts between the isolation diaphragm and input flange.

As shown in FIG. 1, however, a seal support member 58 is used to overcome the foregoing problem. The seal support member 58 comprises an annular, tapered wall 58A disposed within the inlet port 28. The tapered wall 58A further comprises a connecting edge portion 58B and a free edge portion 58C at opposite ends thereof. The tapered wall 58A is joined at its connecting edge portion 58B to the isolation diaphragm 24 and tapers from the diaphragm 24 to the free edge portion 58C. The free edge portion 58C extends inwardly from the inlet port's side wall 30 and forms a central, circular opening 60 for passage of process fluid therethrough from the input flange 34 to act on the underlying isolation diaphragm 24. The connecting edge portion 58B is continuously joined, such as by a laser weld shown at 46, to the outer border of the underlying isolation diaphragm's active region, thus forming a peripheral seal therebetween for containment of the process fluid.

The mounted seal support member 58 thus does not reduce the effective area of the isolation diaphragm's active region 56. The seal support member 58 is suitably sized and tapered such that a conventional pressure sealing ring shown at 62 will be compressed against the coupled input flange 34 to effect an annular seal therebetween. The seal support member 58 overhangs the underlying isolation diaphragm 24 and permits the process fluid to thus act against substantially the entire active region 56. Thus, the effective area of the diaphragm 24 is substantially equal to the entire active region 56 because the sealing ring 62 is not in contact with the active region 56. The present isolation apparatus 12 thus provides an improved effective area of the active region 56 for an isolation diaphragm 24 with respect to a selected size of pressure sealing ring 62, thereby reducing dp/dv related pressure measurement errors and substantially improving transmitter performance.

Figure 2:
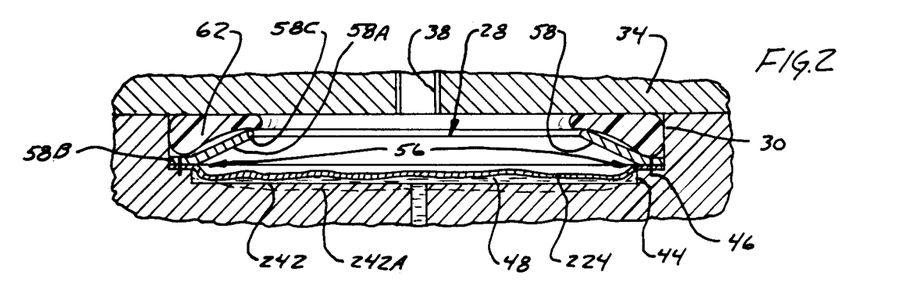
FIG. 2 is a partial sectional view of a transmitter similar to that shown in FIG. 1, showing a second embodiment of the present invention having an isolation diaphragm of dome-like construction mounted therein.

A further preferred embodiment is shown in FIG. 2, wherein an isolation diaphragm 224 is modified to a dome-like construction, such that the isolator chamber 48 can be filled with an isolation fluid 54 while the diaphragm 224 remains in a substantially neutral, low stressed condition. This substantially reduces the stiffness of the isolation diaphragm 224 as it deflects from its neutral position to accommodate the process fluid pressure as well as temperature-induced volume changes of the isolation fluid. Further, a base wall 242 of the inlet port 28 has been modified to define a relatively flat floor, and costs associated with machining a corrugated surface can thus be avoided. If desired, the base wall can be made concave as shown in dashed lines at 242A.

Figure 3:
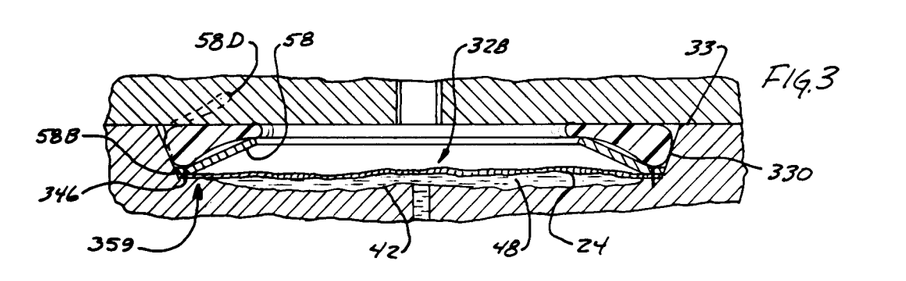
FIG. 3 is a partial sectional view of a transmitter similar to that shown in FIG. 1, having a compression-mounted seal support member and sealing ring isolator assembly according to the invention.

A further preferred embodiment is shown in FIG. 3, wherein a seal support member 58 and an isolation diaphragm 24 are preassembled and an inlet port 328 is modified having a tapering side wall 330 extending inwardly from the housing surface 33 such that the generally round inlet port 328 has a gradually decreasing diameter. As shown in dashed lines at 58D, the seal support member is constructed such that its outside diameter is approximately equal to the largest inside diameter of the inlet port 328. The isolation diaphragm 24 and seal support member 58 are preassembled to form an isolator assembly 359 before insertion into the inlet port 328 by joining the peripheral edge of the isolation diaphragm 24 to the seal support member's connecting edge portion 58B with a suitable weld shown at 346. The outer diameter of the seal support member 58 is reduced during insertion into the inlet port 328. The tapered side wall 330 thus radially compresses the inserted isolator assembly 359, thereby causing the isolation diaphragm's active region to become slack. The seal support member 58 and isolation diaphragm 24 can be further joined to the outer periphery of the base wall 42 by an extended weld 346 for containment of isolation fluid. Since the isolation chamber 48 can be filled while the isolation diaphragm 24 remains in a substantially neutral, low stress condition, dp/dv related pressure measurement errors can be similarly reduced and transmitter performance improved.

Figure 4:
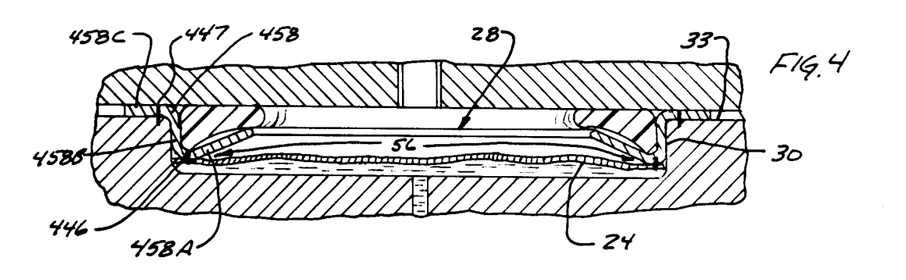
FIG. 4 is a partial sectional view of a transmitter similar to that shown in FIG. 1, showing a further embodiment of the seal support member made according to the invention.

A further preferred embodiment is shown in FIG. 4, wherein a seal support member 458 is modified to provide protection for the inlet port's side wall 30 from corrosive damage which could result from undesired contact with process fluid. The seal support member 458 includes an annular, tapered wall portion 458A similar to that shown in FIG. 1 at 58A, but is also integrally formed with an annular, cylindrical connecting wall portion 458B which is further integrally formed with an annular lip portion 458C that rests upon the housing surface 33 to support the seal support member 458 within the inlet port 28. The isolation diaphragm 24 is connected along its peripheral edge to the seal support member 458 with a suitable weld 446. The lip portion 458C is connected to the housing surface 33 by a weld 447 to provide a fluid pressure seal. Since the seal member 458, as well as the isolation diaphragm 24 and joining weld 446, preferably comprise corrosion resistant material, such as Hastelloy C, Elgiloy, or similar materials, the transmitter/transducer housing material which forms the machined inlet port 28 can be manufactured of less corrosion resistant materials, such as Type 316 Stainless Steel. The foregoing modifications similarly improve the isolation diaphragm's active region 56 thereby reducing dp/dv pressure measurement errors, and can also reduce the cost of transmitter materials.

Figure 5:
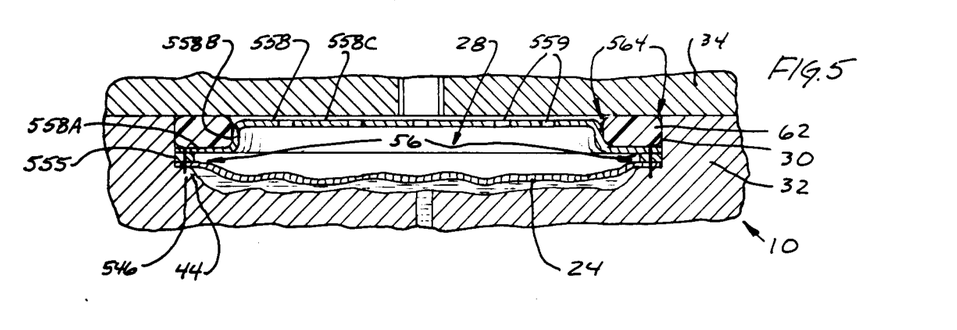
FIG. 5 is a partial sectional view of a transmitter similar to that shown in FIG. 1, showing a further embodiment of the seal support member made according to the invention.

A further preferred embodiment is shown in FIG. 5, wherein a seal support member 558 is modified to provide protection for an isolation diaphragm 24 from damage which can result from handling of a transmitter 10 while uncoupled from an input flange 34. This embodiment further includes a welding sleeve 555 which overlies the peripheral edge of the isolation diaphragm 24, extending inwardly from the inlet port's side wall 30 preferably no further than the width of the annular shoulder 44 beneath the diaphragm 24. A continuous peripheral weld 546 connects both the welding sleeve 555 and the isolation diaphragm 24 to the annular shoulder 44. The seal support member 558 includes a horizontal flange portion 558A along the peripheral edge of the member, integrally formed with a horizontal central plate portion 558C that is offset from the flange portion 558A and being integrally interconnected therewith by an annular, upright, joining wall portion 558B. When fully inserted into the inlet port 28, the flange portion 558A rests upon the welding sleeve 555, such that the seal support member 558 overlies and is spaced away from the isolation diaphragm's active region 56. The central plate portion 558C is provided with a plurality of orifices 559 which permit passage of pressurized process fluid therethrough to act upon the underlying isolation diaphragm 24.

The flange portion 558A and joining wall portion 558B of the seal support member 558 are configured to cooperate with the inlet port's side wall 30 to provide a channel 564 for receiving a conventional pressure sealing ring 62. The seal support member 558 is not welded to the housing 32, and the pressure sealing ring 62 is suitably sized to become compressed within the channel 564, such that the seal support member 558 is easily removed to permit process fluid to be drained and to allow inspection, cleaning or servicing of the isolation diaphragm 24. This embodiment of the present invention similarly improves the isolation diaphragm's active region 56, thereby reducing dp/dv related errors and improving transmitter performance.

Figure 6:
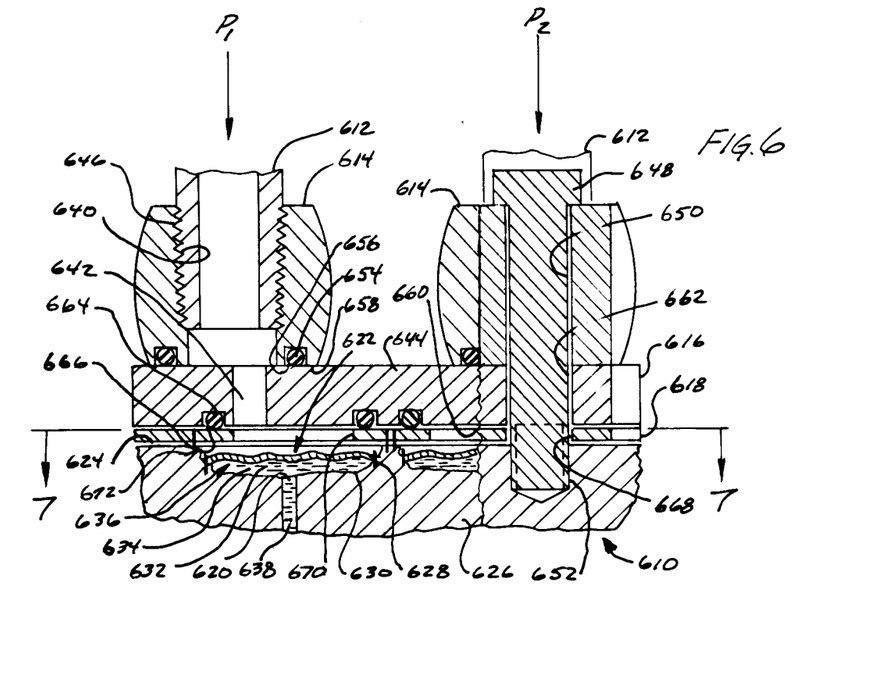
FIG. 6 is a partial sectional view of a differential pressure transmitter taken along line 6—6 of FIG. 7 having coplanar isolation diaphragms mounted therein which are coupled to process piping and industry standard flange adapter unions by a further embodiment of the isolator apparatus according to the invention.
Figure 7:
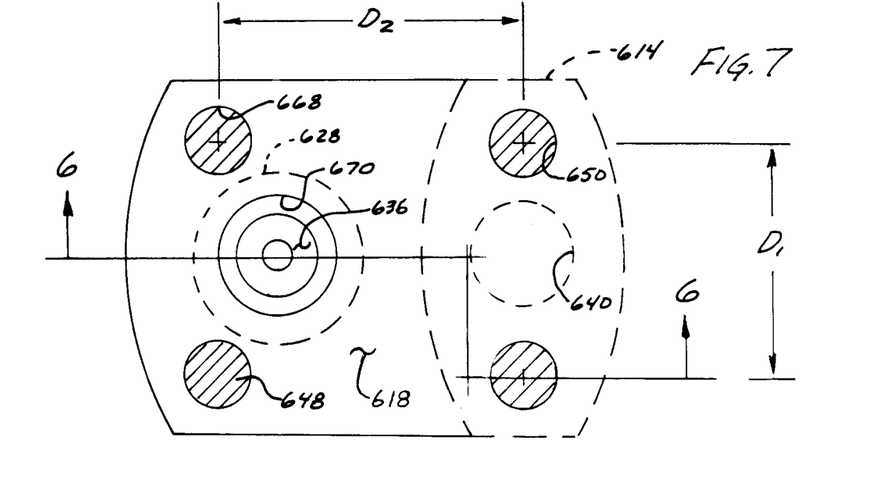
FIG. 7 is a plan view of the isolator apparatus taken along line 7—7 of FIG. 6 according to the invention.

In a further preferred embodiment shown in FIGS. 6 and 7, a differential pressure transmitter is partially shown at 610 which is fluidly coupled to process fluid supplied by a pair of impulse piping legs 612 through the use of a pair of industry standard flange adapter unions 614, an adapter plate 616, and a seal support plate 618. The drawing in FIG. 6 is a sectional view taken along line 6—6 in FIG. 7. The drawing in FIG. 7 is a sectional view taken along line 7—7 in FIG. 6.

The dual isolation diaphragm arrangement and various coupling members illustrated in FIGS. 6 and 7 (such as the impulse piping legs 612, flange adapter unions 614, adapter plate 616 and seal support plate 618) are essentially identical in construction and comprise features or details which are duplicated on the right and left hand sides of FIGS. 6 and 7. It is therefore understood that reference is hereinafter made to such features on either side separately, for convenience. The differential pressure transmitter 610 is provided with a pair of substantially round, coplanar isolation diaphragms 620 disposed in closely adjacent, cylindrical inlet ports 622 formed in a coupling surface 624 of a housing 626 of the transmitter 610.

Each isolation diaphragm is sealingly joined, such as by a peripheral weld 628, to an annular shoulder 630 formed in the cylindrical inlet port 622, which forms an enclosed isolation chamber 632 that is filled with a substantially incompressible isolation fluid 634, such as silicone oil. An active region 636 of the isolation diaphragm 620, which is surrounded by weld 628, comprises the deflectable portion of the diaphragm responsive to pressure from the process fluid. Each isolation chamber 632 opens to a passageway 638 which is also filled with isolation fluid 634 and connects to a suitable pressure sensor (not shown) disposed in the transmitter 610. The pressure sensor senses the pressure of the isolation fluid 634, which corresponds to the process fluid pressures (P1 and P2) exerted upon the two isolation diaphragms 620, and provides a signal representative of the sensed pressure to suitable circuitry which further output a signal representative of such differential pressure being sensed.

The adapter plate 616 and seal support plate 618 are interposed between the flange adapter unions 614 and the transmitter housing 626. The adapter plate 616 and seal support plate 618 are configured such that coplanar isolation diaphragms 620 can be utilized having active regions 636 while still keeping the diaphragms 620 located within a predetermined rectangular area. When coupling process piping to a differential pressure transmitter, this predetermined rectangular area can comprise an industry standard rectangular pattern of bolts, as shown at D1 and D2 in FIG. 7, within which the inlet ports 622 and isolation diaphragms 620 are confined.

An industry standard flange adapter union 614 is used to couple process fluid from the impulse piping leg 612 through a central threaded opening 640 formed in the flange adapter union to an adjacent fluid passageway 642 provided in an outer coupling surface 644 of the adapter plate 616. A suitably threaded end 646 of the impulse piping leg 612 is threaded into the flange adapter union's central threaded opening 640. The flange adapter union 614 is generally shaped as outlined in dashed lines on the right-hand side of FIG. 7. Each flange adapter union 614 is retained to the adapter plate 616 by two bolts or capscrews 648 which pass through smooth bores 650 provided on opposite sides of the central threaded opening 640 and the capscrews 648 are suitably fastened to the transmitter housing 626, such as by being threaded into suitable threaded bores 652 formed in the housing. The spacing D1 between the flange adapter union bores 650 comprise an industry standard pattern of 1⅝" (or 41.3 millimeters) bolt centerlines. Each flange adapter union 614 also carries a suitable standard pressure seal 654, such as an O ring formed of resilient material, which is compressed between the flange adapter union 614 and the adapter plate's outer coupling surface 644 in an annular groove 656 formed in a coupling surface 658 of the flange adapter union 614, when clamped together by the capscrews 648. The seal 654 thus provides a substantially fluid tight annular pressure seal around the coupled flange adapter union's central threaded opening 640 and the adapter plate's passageway 642.

The adapter plate 616, which is interposed between the flange adapter unions 614 and the seal support plate 618, is used to provide proper lateral spacing D2 between the flange adapter unions 614 while permitting closely spaced apart, coplanar isolation diaphragms 620 having active regions 636 as large as possible. The adapter plate 616 is relatively thin and has a flat outer coupling surface 644 against which the flange adapter unions 614 are coupled, and a flat inner coupling surface 660 against which the seal support plate 618 is coupled. The adapter plate is provided with four smooth bores 662 which are spaced apart according to an industry standard spacing of 1⅝" (D1) by 2⅛" (D2) rectangular pattern of bolt centerlines. The 1⅝" (or 41.3 millimeter) (D1) spacing is characteristic of the standard flange adapter union's bolt spacing. The 2⅛" (or 54 millimeters) (D2) spacing is compatible with an industry standard, ANSI Standard B 16.36 "Steel Orifice Flange Standard" (or DIN Standard 19 213, April, 1980), required for conventional connection of a differential pressure transmitter to a conduit fitted with a standard orifice flange/plate assembly, to which process piping of the type shown in FIGS. 6 and 7 is plumbed. The lateral spacing D2 also permits the flange adapter unions 614 to swing past each other about their centers when they are being threaded onto side by side impulse piping legs 612.

The adapter plate's passageways 642 extend from the outer coupling surface 644 through to the inner coupling surface 660. The spacing between the passageways 642 is selected such that the centers of the passageways 642 are slightly offset from the centers of the flange adapter unions' central threaded openings 640, as well as being slightly offset from the centers of the inlet ports 622 and isolation diaphragms 620. This spacing of the passageways 642 permits coupling of flange adapter unions 614 at industry standard spacing to a differential pressure transmitter 610 which is equipped with coplanar isolation diaphragms 620 that are closely spaced apart having active regions 636 as large as possible.

The seal support plate 618, which is interposed between the adapter plate 616 and the transmitter housing 626, is used to support suitable pressure seals 664 which are carried in annular grooves 666 formed in the adapter plate's inner coupling surface 660 and provide a substantially fluid tight annular pressure seal when compressed therebetween. The seal support plate 618 is relatively thin and is provided with four smooth bores which are also spaced apart according to industry standard (D1 by D2) and substantially align with the flange adapter union bores 650, adapter plate bores 662, and transmitter housing bores 652, such that the capscrews 648 pass therethrough to retain the entire assembly to the transmitter 610 and provide the necessary compression for sealing the pressure seals 654 and 664. A pair of fluid orifices 670 are also provided in the seal support plate 618 and are located such that they properly align with the adapter plate passageways 642 and inlet ports 622 to permit process fluid flow therethrough. Each orifice 670 preferably is large enough to expose sufficient surface area of the underlying isolation diaphragm 620 to permit inspection and cleaning if desired. The seal support plate 618 should, however, extend over each inlet port 622 and diaphragm 620 a sufficient distance to provide adequate support for each of the adapter plate's annular seals 664. The seal support plate 618 is sealingly joined to the transmitter housing's coupling surface 624, such as by annular welds 672 provided adjacent the outer periphery of the inlet ports 622, thus forming an annular seal for containment of the process fluid.

In this embodiment of the invention, coplanar isolation diaphragms 620 are confined within a predetermined region, while providing diaphragms 620 which have improved effective areas of the active regions 636. The pressure seals 664 carried in the adapter plate 616 are supported over the active regions 636 of the diaphragms 620 outside of the inlet ports 622. The seal support plate 618 partially overhangs each isolation diaphragm 620 and permits the process fluid to thus act against substantially the entire active region 636. The isolation diaphragm's effective area is thus substantially equal to its active region 636. It is understood, however, that the foregoing invention's utility is not limited to multiple, coplanar isolation diaphragm arrangements. A single isolation diaphragm could be coupled, for example, to a flange adapter union without the use of an adapter plate, by modifying a seal support plate for direct support of an overlying flange adapter union pressure seal. The foregoing isolator apparatus improves an isolation diaphragm's effective area which reduces dp/dv related pressure measurement errors.

Each of the foregoing embodiments of the present invention thus improve the effective area of the active region of an isolation diaphragm with respect to a selected size of pressure seal, thereby substantially improving pressure transmitter performance. The present invention can also reduce the cost of transmitter materials, and permits the use of pressure transmitters having smaller diameter isolation diaphragms with correspondingly reduced sizes of transmitter housings, without compromising performance.

Although the present invention has been described with reference to preferred embodiments, workers skilled in the art will recognize that changes may be made in form and detail without departing from the spirit and scope of the invention.

What is claimed is:

1. Apparatus for isolatingly coupling a pressure from a fluid in an input member to a pressure sensor providing an output as a function of the pressure, comprising:
   an inlet port disposed in the apparatus for receiving the fluid from the input member;
   isolation means disposed in the inlet port and having an active region bounded by an outer border for isolatingly coupling the pressure from the fluid to the pressure sensor;
   sealing means disposed in the inlet port around the isolation means for sealingly coupling the fluid from the input member to the isolation means; and
   support means disposed in the inlet port for supporting the sealing means to overlie at least a portion of the isolation means adjacent the outer border and spacing at least the portion of the sealing means away from the active region, such that an effective area of the active region is improved.

2. The apparatus of claim 1 wherein the isolation means further comprise a deflectable diaphragm including the active region.

3. The apparatus of claim 2 wherein the isolation means further comprise a substantially incompressible fluid coupling the pressure from the diaphragm to the sensor.

4. The apparatus of claim 3 wherein the improved effective area of the active region of the diaphragm provides an improved accomodation of volumetric changes of the incompressible fluid.

5. The apparatus of claim 4 wherein the sealing means further comprise a resilient seal.

6. The apparatus of claim 5 wherein the support means further comprise a seal support member overhanging the active region of the diaphragm and spaced a selected distance therefrom for supporting the resilient seal between the seal support member and the input member, the seal support member having a central opening for passage of pressurized fluid therethrough.

7. The apparatus of claim 6 wherein the seal support member is removably mounted in the inlet port.

8. The apparatus of claim 6 wherein the seal support member further comprises a tapered wall disposed over the outer border of the active region and extending inwardly therefrom and tapering away from the active region a selected distance, such that the sealing member overlies and is spaced away from the active region.

9. The apparatus of claim 6 wherein the seal support member overlies and extends substantially across the active region, the seal support member having at least one orifice coupling the pressurized fluid therethrough from the conduit to the active region, such that the active region is provided protection from damage.

10. The apparatus of claim 6 wherein the inlet port comprises a recess in an outer surface of the apparatus, the recess having an annular, tapered side wall extending inwardly from the outer surface and tapering to a decreasing diameter in inward direction, and wherein the outer border of the isolation diaphragm is sealingly joined to the seal support member to comprise an isolator assembly, the isolator assembly being compressed in the tapered side wall, such that the active region is improved.

11. An instrument comprising a pair of apparatus as recited in claim 6, wherein the inlet ports are disposed in a substantially coplanar relationship and wherein the input members comprise a pair of industry standard flange adapter unions spaced apart at an industry standard spacing.

12. The apparatus of claim 2 wherein the diaphragm is constructed to have a domed shape, such that the active region is improved.

13. Apparatus for coupling a fluid under pressure carried through a pressure opening in an input member to a diaphragm of a pressure sensor comprising:
 a housing;
 a diaphragm supported on said housing, said diaphragm being sealed around a periphery, and having a central active region bounded by an outer border adjacent its periphery;
 a bounding seal supported on said housing and adapted to circumbsribe the pressure opening in the input member when the input member is coupled to the housing;
 support means supported on the housing adjacent the outer border of the diaphragm and extending inwardly toward the center of the diaphragm and having at least portions spaced from the diaphragm and overlying the active region bounded by the outer border to support the sealing means at portions that overlie the active region whereby fluid under pressure admitted by the pressure opening will act on an active area of the diaphragm that is greater than the area circumscribed by the bounding seal.

14. Apparatus for coupling a fluid under pressure from a fluid pressure opening in an input member to a pressure sensor providing an output as a function of the pressure, comprising:
 an inlet port formed in the apparatus for receiving the fluid from the pressure opening of the input member;
 isolation means disposed in the inlet port and having an actice region bounded by an outer border for isolatingly coupling the pressure from the fluid to the pressure sensor;
 sealing means disposed in the inlet port to bound the isolation means for sealingly coupling the fluid under pressure from the pressure opening in the input member to the isolation means; and
 support means mounted on the housing for supportingly spacing the sealing means away from the active region, such that an effective pressure receiving area of the active region is greater than the area bounded by the sealing means.

15. The apparatus of claim 14 wherein the isolation means further comprise a deflectable diaphragm including the active region and a substantially incompressible fluid coupling the pressure acting the diaphragm from the diaphragm to the sensor.

16. The apparatus of claim 14 wherein the sealing means further comprise a resilient seal.

17. The apparatus of claim 14 wherein said sealing means further comprises a seal made of a material having the sealing properties of tetrafluoroethylene.

* * * * *

UNITED STATES PATENT AND TRADEMARK OFFICE
CERTIFICATE OF CORRECTION

PATENT NO. : 4,798,089
DATED : January 17, 1989
INVENTOR(S) : Roger L. Frick

It is certified that error appears in the above-identified patent and that said Letters Patent is hereby corrected as shown below:

Col. 4, Line 19, After "representative", delete "to", and insert --of--.

Col. 4, Line 25, delete "cna", and insert --can--.

Col. 4, Line 44, delete "the-housing", and insert --the housing--.

Col. 11, Line 3, delete "accomodation", and insert --accommodation--.

Col. 12, line 28, delete "actice" and insert -- active --.

Signed and Sealed this

Twelfth Day of September, 1989

Attest:

DONALD J. QUIGG

Attesting Officer

Commissioner of Patents and Trademarks